US012662357B2

(12) United States Patent
Assfalg et al.

(10) Patent No.: US 12,662,357 B2
(45) Date of Patent: Jun. 23, 2026

(54) GRID-POWERED MATERIAL HANDLING AND/OR CONSTRUCTION MACHINE

(71) Applicant: Liebherr-Werk Biberach GmbH, Biberach an der Riss (DE)

(72) Inventors: Martin Assfalg, Attenweiler (DE); Michael Gollack, Biberach an der Riss (DE); Thomas König, Biberach an der Riss (DE); Gerhard Schmid, Wolpertswende (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 210 days.

(21) Appl. No.: 18/600,418

(22) Filed: Mar. 8, 2024

(65) Prior Publication Data

US 2024/0228238 A1 Jul. 11, 2024

Related U.S. Application Data

(63) Continuation of application No. PCT/EP2022/072242, filed on Aug. 8, 2022.

(30) Foreign Application Priority Data

Sep. 10, 2021 (DE) .......................... 102021123502.2

(51) Int. Cl.
B66C 13/00 (2006.01)
B66C 13/12 (2006.01)
(Continued)

(52) U.S. Cl.
CPC .............. B66C 13/12 (2013.01); B66C 13/22 (2013.01); B66C 13/50 (2013.01); H02H 7/0833 (2013.01)

(58) Field of Classification Search
CPC ......... B66C 13/12; B66C 13/22; B66C 13/50; B66C 23/26; H02H 7/0833
See application file for complete search history.

(56) References Cited

U.S. PATENT DOCUMENTS 4,358,719 A 11/1982 Currier et al.
2019/0202305 A1* 7/2019 Jung ..................... B60L 53/665
(Continued)

FOREIGN PATENT DOCUMENTS

CA 2142532 8/1995
CN 110014937 A * 7/2019 .............. H02J 7/342
(Continued)

*Primary Examiner* — Emmanuel M Marcelo
(74) *Attorney, Agent, or Firm* — Levine Bagade Han LLP

(57) ABSTRACT

The present invention relates to a material handling and/or construction machine, in particular lifting gear such as a crane, comprising a plurality of electric drives for driving work assemblies and/or structural components of the material handling and/or construction machine, a control apparatus for controlling the drives, and a power supply device for supplying electric power to the electric drives, wherein the power supply device has a grid connection for connection to a power grid and drawing of the electric power from the power grid, wherein a measuring device for measuring the total electric power consumption of the material handling and/or construction machine from the power grid is provided at the grid connection at the machine-end grid connection.

11 Claims, 2 Drawing Sheets

(51) Int. Cl.
*B66C 13/22*          (2006.01)
*B66C 13/50*          (2006.01)
*H02H 7/08*          (2006.01)

(56)                    References Cited

U.S. PATENT DOCUMENTS

| 2022/0271563 | A1* | 8/2022 | Hug | H02J 9/06 |
|---|---|---|---|---|
| 2025/0178467 | A1* | 6/2025 | Jang | B60L 53/11 |

FOREIGN PATENT DOCUMENTS

| CN | 211556955 | U | * | 9/2020 | |
|---|---|---|---|---|---|
| CN | 113423604 | A | * | 9/2021 | H02J 9/06 |
| DE | 102010063911 | | | 6/2012 | |
| DE | 112013001281 | T5 | | 12/2014 | |
| DE | 102015225910 | | | 11/2016 | |
| DE | 102015008038 | | | 12/2016 | |
| DE | 202018003633 | U1 | | 10/2018 | |
| DE | 102017222949 | | | 6/2019 | |
| DE | 102022201440 | A1 | * | 8/2023 | B60L 53/66 |
| JP | 2009-197514 | | | 9/2009 | |
| JP | 2014169162 | A | * | 9/2014 | |
| JP | 2014184996 | A | * | 10/2014 | |
| JP | 2014193763 | A | * | 10/2014 | |
| KR | 102057146 | B1 | * | 12/2019 | B60L 53/18 |
| WO | WO 2022/033982 | | | 2/2022 | |
| WO | WO 2023/036531 | | | 3/2023 | |

* cited by examiner

GRID-POWERED MATERIAL HANDLING AND/OR CONSTRUCTION MACHINE

CROSS-REFERENCE TO RELATED APPLICATIONS

This application is a continuation of International Patent Application Number PCT/EP2022/072242 filed Aug. 8, 2022, which claims priority to German Patent Application Number DE 10 2021 123 502.2 filed Sep. 10, 2021, which are incorporated herein by reference in their entireties.

BACKGROUND

The present invention relates to a grid-powered material handling and/or construction machine, in particular in the form of a crane such as a revolving tower crane or another lifting gear, having a plurality of electric drives for driving work assemblies and/or structural parts of the material handling and/or construction machine, a control apparatus for controlling the drives, and a power supply device for supplying the electric drives with electric power, the power supply device having a grid connection for connection to a power grid and feeding the electric drives from the power grid.

Cranes such as revolving tower cranes have been connected to the power grid available at the respective assembly site for some time in order to supply the crane's electric drives, such as its hoisting gear drive, its slewing gear drive, its trolley drive and, if necessary, its luffing gear drive, with electric power. For this purpose, the crane has a grid connection for connection to the power grid and feeding the electric drives from the power grid. Various other construction machines such as concrete pumps or material handling machines in general, such as earthmoving machines in the form of excavators or lifting gear in the form of cable excavators, for example, also often have electric drives, but these are diesel-electrically powered by a generator driven by a diesel engine. Even for such mobile machines, which to this point have diesel-electric drive concepts, the aim is to feed the electric drives from a grid connection in order to be able to work locally emission-free and to use the machine's grid connection wherever a grid connection is available.

A fundamental requirement for such a grid supply is to be able to supply the crane or material handling and/or construction machine with electricity as frequently, easily and safely as possible in order to achieve a high level of customer benefit. If possible, the machine should be able to be connected to the local grid supply as a plug-and-play module without the need to retrofit the machine each time or undertake extensive precautions.

One problem in this respect is that mobile work machines such as cranes or other material handling and/or construction machines are connected to different power grids at different locations, which provide different outputs and are configured differently locally. This leads to problems in that a particular crane cannot be set up if the locally available power grid does not provide the necessary power or the material handling and/or construction machine would overload the local power grid.

The external power supply requires a grid power that is at least equal to, but preferably greater than, the maximum power consumption of the material handling and/or construction machine in order to ensure that the power supply is guaranteed even when all drives of the working machine are activated and the power grid is not overloaded. To protect the latter, the connections to the power grid are sometimes protected by appropriate circuit breakers to ensure that the power grid is at least not overloaded. However, this is costly and also affects the operation of the machine connected to the grid.

Based on this, it is an underlying object of the present invention to create an improved material handling and/or construction machine which avoids the disadvantages of the prior art and further develops the latter in an advantageous manner. In particular, the aim is to enable a simple and safe electrical supply to the material handling and/or construction machine from power grids with different characteristics, which takes into account and optimally utilizes the available grid power without overloading the grid or the power line or having to equip the grid with circuit breakers at great expense.

SUMMARY

According to the invention, said task is solved by a material handling and/or construction machine. Preferred embodiments of the invention are the subject of the dependent claims.

It is therefore proposed to measure the overall power consumption of the crane and, depending on the power grid to which the material handling and/or construction machine is connected, to specifically control and adapt it to the power grid. According to the invention, the material handling and/or construction machine has a measuring device for measuring the total electric power consumption from the power grid at the machine-end grid connection. A measuring device of this type ensures that the actual power drawn by the machine directly at the infeed is always known, so that the load on the supplying power grid is always up-to-date and precisely known.

The measuring signal of said measuring device, which indicates the total power consumption of the machine at its grid connection, can be used advantageously in various ways. For example, a display in the driver's cab can show the current power consumption. In particular, however, the measurement signal can also be made available to the control apparatus of the material handling and/or construction machine in order to take automatic or semi-automatic measures to avoid overloading the power grid. This means that the material handling and/or construction machine can also be operated on networks that provide less power than the material handling and/or construction machine normally requires or when operating at maximum power.

In particular, the control apparatus can be configured to compare the measured total electric power consumption with the maximum available power from the power grid and to reduce the power consumption of one or more electric drives in dependence on said comparing. If the measuring device determines that the total electric power consumption of the material handling and/or construction machine is approaching or even reaching the maximum available power from the power grid, the control apparatus can reduce or limit the power of one or more electric drives in order to prevent the total electric power consumption of the machine from increasing further and overloading the connected power grid.

Such a power reduction or limit can be implemented by the control apparatus in different manner. For example, the control apparatus can reduce and/or limit the positional speed(es) of one or more drives in order to reduce or limit the power consumption at the respective drives when the measured total power consumption of the machine approaches, reaches or even exceeds the available grid power.

For example, the control apparatus can be configured to scale or rescale control commands for controlling the electric drives, which are input by a machine operator via input means such as joysticks, sliders, controllers or rotary knobs or are specified by an automatic travel control system, in dependence on said comparing of the measured power consumption at the grid connection with the available grid power and/or to limit them to a predetermined value that is reduced compared to the maximum possible control command value. If, for example, the machine operator enters a movement request at maximum speed, for example by tilting the joystick, e.g. lifting the load hook on a crane at maximum lifting speed, the control apparatus can be configured to reduce the said control command "Move or lift at maximum positional speed" to a lower control command of, for example, 75% of the maximum positional speed and, so to speak, override the control command specified by the machine operator or the automated control module, so that only a reduced control signal is given to the electric drive.

The control apparatus can be configured to provide a power reduction uniformly for all existing or all currently operated electric drives, for example to limit the positional speed of all electric drives to a predetermined fraction of their maximum positional speed if the total electric power consumption at the grid connection measured by the measuring device reaches, approaches or even exceeds the available grid power. Alternatively to such a uniform power reduction of all drives, the control apparatus can also be configured to provide different power-reducing measures for different drives, for example to reduce the hoisting gear of a crane to 75% of the maximum positional speed and to provide no or a lower or possibly also a greater speed limitation or reduction for the slewing gear of the crane and/or the trolley chassis of the crane. For example, the control apparatus can provide a greater power reduction or limit for a drive that has a high power consumption and a lower or no power reduction or limit for another drive that has a comparatively lower power consumption.

Alternatively or additionally to reducing or limiting the power of one or more drives, the control apparatus can also switch on an energy supply storage unit and/or increase the power draw from the energy supply storage unit to supply the electric drives in dependence on the comparing of the measured power consumption at the machine-end grid connection and the available grid power. For example, the material handling and/or construction machine can have one or more batteries or other energy storage devices for storing electrical energy, such as capacitors, which can provide electric power for the drives in addition to the grid connection. If the measured actual total power consumption of the machine approaches, reaches or even exceeds the available grid power, the control apparatus can switch on the energy storage of the machine or increase the power consumption from it in order to reduce or limit the load on the power grid.

The control apparatus can primarily provide for a power draw from the power grid via the grid connection and only then connect the energy storage system or only increase the power draw from it to such an extent that the power draw from the grid does not exceed its available grid power or, in comparison, does not exceed a predetermined level. Alternatively or additionally, the control apparatus can also take into account the storage status of the energy supply storage unit in order to reduce the power consumption from the power grid and/or ensure efficient use of the stored energy.

If, for example, the energy storage system has a predetermined charge level or if the charge level exceeds a certain threshold value, the control apparatus can switch on the energy storage system or increase the power draw from it even if the total power consumption of the machine itself has not yet reached or is approaching the maximum available grid power. Such a priority power draw from the energy supply storage unit can be useful, for example, if the amount of energy stored in a capacitor reaches a predetermined level that makes it sensible to recycle the stored energy.

In order to make it easy to connect the machine to different power grids, the control apparatus can, in a further development of the invention, have an input interface via which the maximum available power of the power grid to be connected in each case can be entered. The control apparatus can then use the maximum grid power made available via the input interface for said comparing with the measuring device's measuring signal, which indicates the actual, total power consumption of the machine.

Said input interface can be connected to a manual input means, such as a touch screen or a voice recognition system, which a machine operator or setup technician can use to manually input the grid power of the power grid to be connected.

Alternatively or additionally, an automated input can also be made if the power grid provides an identifier that indicates the maximum grid power. In this case, the machine's control apparatus can read in said identifier and use it as the basis for comparing the measuring device's measuring signal.

In order not to have to provide any special safety measures on the power grid side for connecting the material handling and/or construction machine to the power grid, according to a further aspect of the present invention, a circuit breaker adapted to the power grid to be connected can be provided at the machine-end grid connection, which is designed to interrupt the connection to the power grid when the total power consumption of the machine reaches the maximum available power of the power grid or a certain level adapted thereto. In particular, said circuit breaker is adapted to the power grid in terms of its rated residual current at which the circuit breaker switches off, in particular its maximum available power.

In particular, said circuit breaker may comprise a universal current sensitive residual current circuit breaker, which is installed in the area of the grid connection of the machine in such a way that the total power of the machine drawn via the grid connection passes through said universal current sensitive residual current circuit breaker. If the actual, total power consumption of the machine reaches the level of the rated error current of the universal current sensitive error current circuit breaker, the latter switches off and disconnects the machine from the power grid.

Advantageously, the circuit breaker can be configured to be adjustable with regard to its rated error current, when this is reached the circuit breaker switches off, so that it can be adapted to the power grid to be connected when the machine is connected to different power grids. For example, the rated residual current can be adjusted in dependence on the maximum grid power entered via said input interface, preferably via said control apparatus of the machine, which is provided with the maximum grid power of the power grid to be connected for the described comparing with the measured actual power consumption.

Alternatively or additionally, however, an alternatively configured circuit breaker can simply be fitted to the grid connection of the machine, which is adapted to the power grid to be connected in terms of its rated residual current.

BRIEF DESCRIPTION OF THE DRAWINGS

The invention is explained in more detail below with reference to a preferred embodiment and associated drawings. The drawings show.

DETAILED DESCRIPTION

Figure 1:
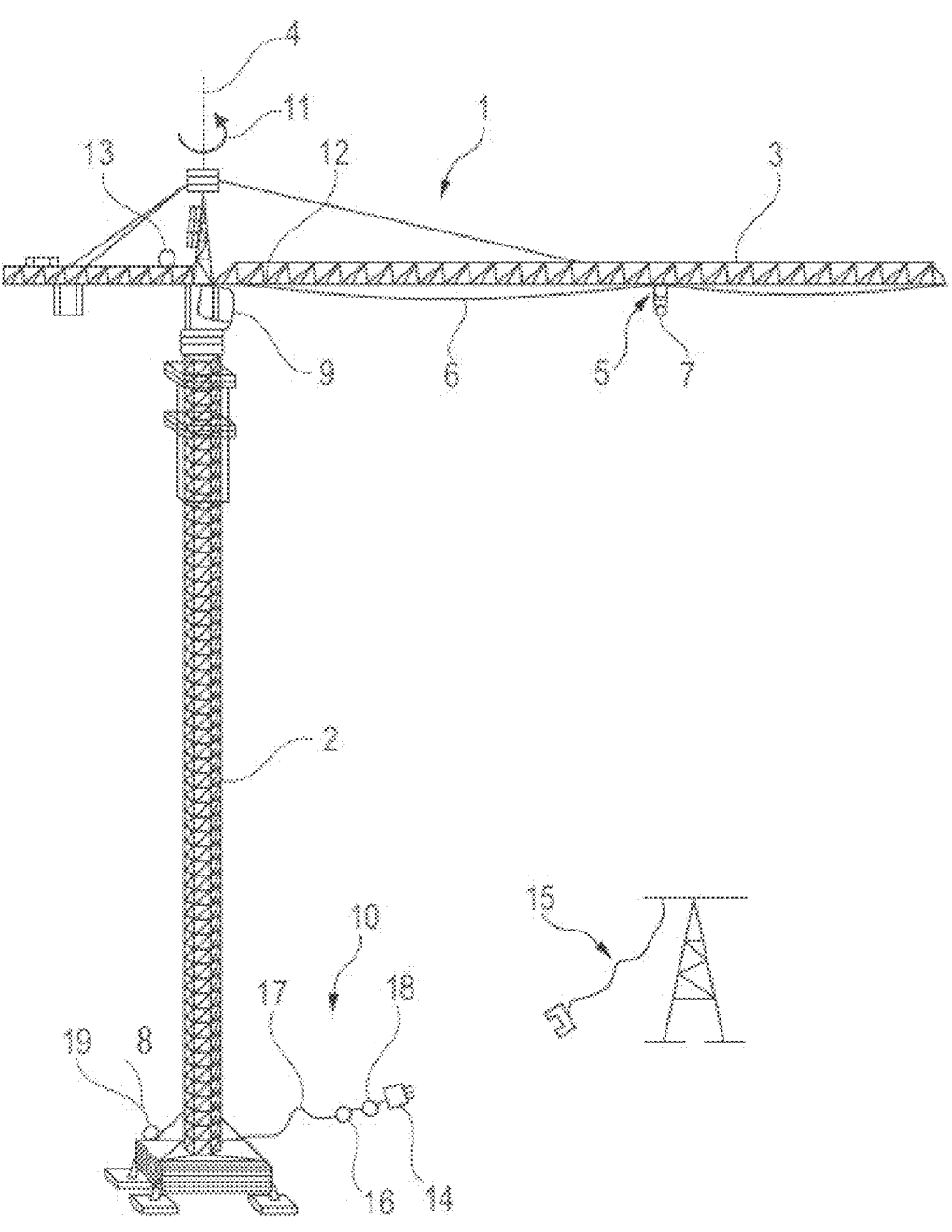
FIG. 1: a material handling and/or construction machine in the form of a revolving tower crane according to an advantageous embodiment of the invention, which can be connected via a grid connection to a power grid present at a construction site.

As FIG. 1 shows, the material handling and/or construction machine 1 can be configured to be a crane, in particular a revolving tower crane, which comprises a tower 2 and a jib 3 supported by it as structural components, which can be held by a bracing and balanced via a ballast weight on a counter-jib.

The material handling and/or construction machine 1 comprises several electric drives 11, 12 and 13, wherein in case of a crane this can be a slewing gear drive 11, a trolley drive 12 and a hoist drive 13. As shown in FIG. 1, a trolley 4 can be movably mounted on the said jib 3, which can be moved along the jib 3 by said trolley drive 12, wherein the trolley drive 12 can comprise an electric motor which can wind and unwind a trolley cable on a winch or drive it around in the manner of a capstan winch.

A lifting cable 6 can run from the aforementioned trolley 4, which carries a load suspension means such as for example a load hook 7. The hoist drive 13 can wind and unwind said hoist cable 6 on a winch and comprise an electric motor for driving the winch.

The jib 3 can also be driven in rotation about an upright axis, in particular the longitudinal axis of the tower, by the slewing gear drive 11. When configured as a top-slewer the jib 3 can be rotated relative to the tower 2, while with a bottom-slewer the jib 3 is rotated together with the tower 2 about the said upright axis 4.

Said electric drives in the form of slewing gear drives, trolley chassis drives and hoist drives 11, 12 and 13 are controlled by a control apparatus 8, wherein the control apparatus 8 may be configured to be electronic and may have a microprocessor and a program memory connected thereto. In particular, the control apparatus 8 can implement control commands which a crane driver in the driver's cab 9 can input via suitable input means such as joysticks and the like.

A power supply device 10 for supplying the said electric drives 11, 12, 13 with electric power comprises a grid connection 14, through which the material handling and/or construction machine 1 can draw electric power from a power grid 15, which supplies the spatial area of a respective construction site or a respective assembly site or operating site and can, for example, be the supply grid of the respective utility company.

Said grid connection 14 may in particular comprise a multi-pole power plug which can be connected to a socket or a complementary connector of the power grid 15.

6

Figure 2:
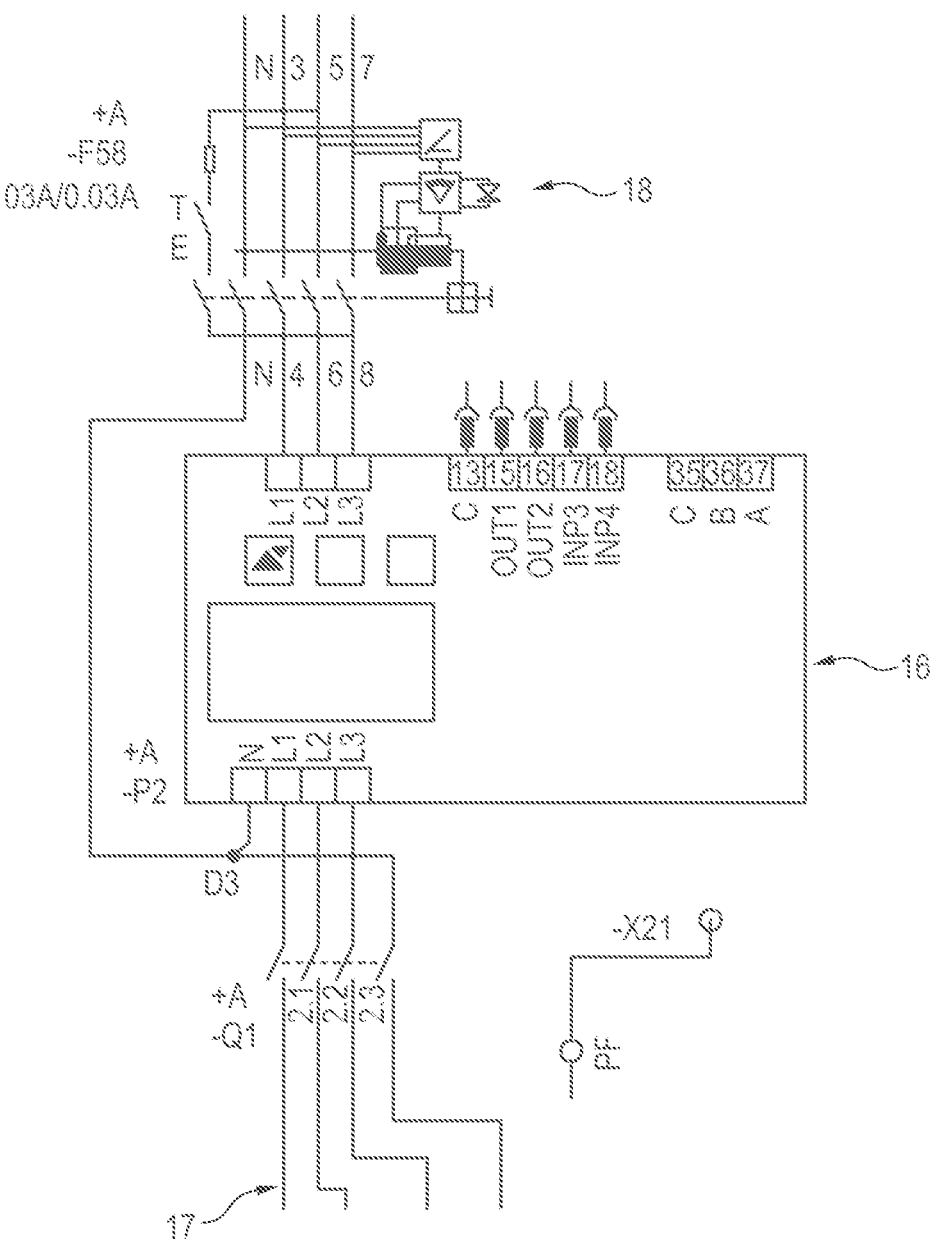
FIG. 2: a circuit diagram of the grid connection of the material handling and/or construction machine from FIG. 1, showing the measuring device provided at the grid connection and the universal current sensitive residual current circuit breaker there provided.

At the grid connection 14 or a point of the machine-end circuit through which the total power consumption of the material handling and/or construction machine 1 flows from the grid connection 14, the material handling and/or construction machine 1 has a measuring device 16 for measuring the total electric power consumption from the power grid 15, see FIG. 1 and FIG. 2. If the grid supply line 17 is usually multi-pole, for example four-pole, the measuring device 16 can be connected to the cores of the supply line 17, see FIG. 2, and measure the total current flow through the grid supply line 17. The measuring device 16 can measure the power consumption in various ways, for example by measuring the current flow and/or the voltage, and can comprise suitable measuring modules for this purpose, see FIG. 2.

Furthermore, a circuit breaker 18 is provided at the grid connection 14 of the material handling and/or construction machine 1 or at the measuring device 16 and/or at a point of the machine-end grid connection through which the total power consumption passes, which may comprise a universal current sensitive residual current circuit breaker. Such a universal current sensitive residual current circuit breaker 18 can, for example, be configured to have four poles, see FIG. 2, so that it can be connected to the four-pole grid supply line 17 and, if necessary, be configured to be converter-fixed.

The measuring signal of the measuring device 16, which indicates the total current power consumption of the machine 1, is advantageously provided to the control apparatus 8, which can compare the total power consumption with a limit value that can be determined in dependence on the maximum available power of the respective power grid 15, for example equated with the maximum available grid power or set to a predetermined fraction thereof. The said limit value in dependence on the maximum available power of the power grid 15 can advantageously be provided via an input interface of the control apparatus 8.

The control apparatus 8 is advantageously configured to compare the current actual, measured power consumption of the machine 1 with the maximum available power or said limit value, which was input via the input interface, in order to provide a power reduction for the electric drives 11, 12, 13 in the manner described at the beginning, if necessary.

Alternatively or additionally, the control apparatus 8 can also connect an energy supply storage unit 19 of the power supply device 10 and/or increase the power draw from such a storage unit in order to prevent an overload of the power grid 15. Such an energy supply storage unit 19 may comprise a battery cell and/or a capacitor or several groups or mixed forms thereof, wherein the energy storage unit 19 may be provided independently thereof on the material handling and/or construction machine 1. If necessary, a separate energy supply storage unit, for example in the form of a storage container, can also be provided at the assembly site of the machine and connected to the machine.

We claim:

1. A material handling and/or construction machine, wherein the machine comprises:

a plurality of electric drives for driving work assemblies and/or structural components of the material handling and/or construction machine;

a control apparatus for controlling the plurality of electric drives;

a power supply device for supplying the electric drives with electric power, wherein the power supply device has a grid connection for connection to a power grid and drawing of the electric power from the power grid;

wherein a measuring device for measuring a total electric power consumption of the material handling and/or construction machine from the power grid is provided at the grid connection; and wherein the control apparatus is configured to:

compare the total electric power consumption measured with a maximum power available from the power grid and/or a limit value dependent thereon and to reduce and limit the power consumption of said plurality of electric drives in dependence on the comparing;

to scale control commands entered by a machine operator and/or generated by a machine control module for controlling the electric drives in dependence on the comparing and to limit them to a reduced maximum value; and to provide different power-reducing measures for different ones of said electric drives, and to provide a greater power reduction for an electric drive that has a high power consumption and a lower power reduction for another electric drive that has a comparatively lower power consumption.

2. The material handling and/or construction machine according to claim 1, wherein the control apparatus is configured to reduce one or more driving speeds of one or more electric drives and to override a driving speed command indicating a desired driving speed.

3. The material handling and/or construction machine according to claim 1, wherein the control apparatus is configured to reduce one or more driving speeds of one or more electric drives and to override a driving speed command indicating a desired driving speed.

4. The material handling and/or construction machine according to claim 1, wherein the control apparatus is configured to switch on an energy supply storage unit in dependence on said comparing and/or to increase the power withdrawal from the energy supply storage unit for supplying the electric drives when the total power consumption of the material handling and/or construction machine reaches the maximum available power of the power grid or the limit value derived therefrom or a predetermined fraction thereof.

5. The material handling and/or construction machine of claim 1, wherein the control apparatus has an input interface for inputting a maximum available power of the power grid to be connected.

6. The material handling and/or construction machine of claim 1, wherein material handling/construction machine is a lifting gear or a crane.

7. A material handling and/or construction machine, wherein the machine comprises:

a circuit breaker at a machine-end grid connection, wherein the circuit breaker is matched to a respective power grid to be connected, via which a total power consumption of the material handling and/or construction machine drawn from the power grid runs, wherein the circuit breaker comprises a universal current sensitive error current circuit breaker.

8. The material handling and/or construction machine of claim 7, wherein the universal current sensitive error current breaker is configured to have multiple poles and is connected to cores of a grid supply line of the material handling and/or construction machine.

9. The material handling machine and/or construction machine of claim 8, wherein the circuit breaker has a rated residual current, wherein the circuit breaker is adjustable with respect to the rated residual current, and wherein the circuit breaker is configured to switch off upon reaching the rated residual current.

10. The material handling machine and/or construction machine of claim 7, wherein the circuit breaker has a rated residual current, wherein the circuit breaker is adjustable with respect to the rated residual current, and wherein the circuit breaker is configured to switch off upon reaching the rated residual current.

11. The material handling machine and/or construction machine of claim 7, wherein the circuit breaker has a rated residual current, wherein the circuit breaker is adjustable with respect to the rated residual current, and wherein the circuit breaker is configured to switch off upon reaching the rated residual current.

* * * * *